Oct. 31, 1933.  S. C. HOARE  1,933,327
ELECTRICAL INSTRUMENT
Filed March 3, 1932
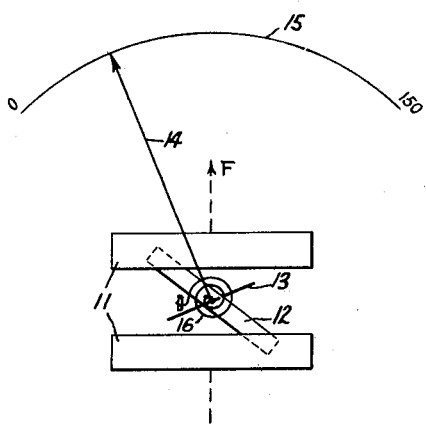
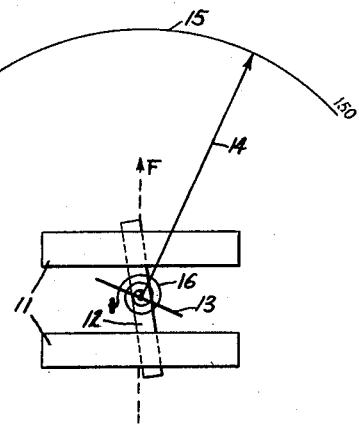
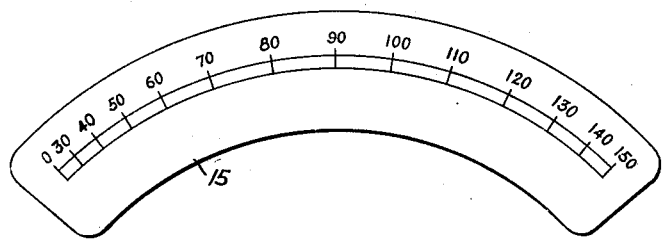
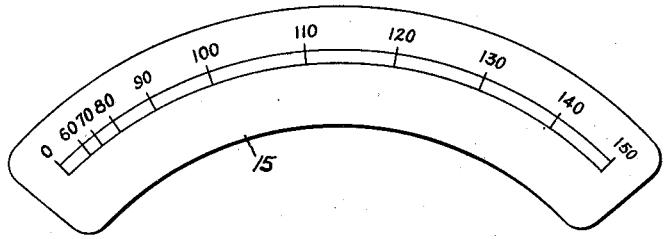
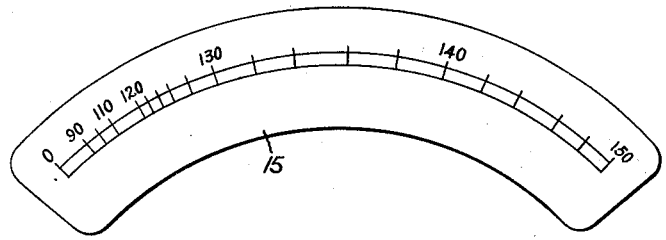
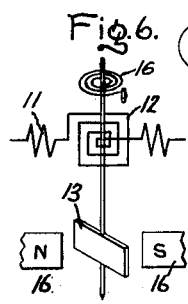
Inventor:
Stephen C. Hoare,
by Charles N. Tulla
His Attorney.

Patented Oct. 31, 1933

1,933,327

UNITED STATES PATENT OFFICE 1,933,327

ELECTRICAL INSTRUMENT

Stephen C. Hoare, Manchester, Mass., assignor to General Electric Company, a corporation of New York Application March 3, 1932. Serial No. 596,486

3 Claims. (Cl. 171—95)

My invention relates to electrical instruments and current responsive devices, and concerns particularly measuring instruments of the expanded scale type.

It is an object of my invention to provide a compact instrument of increased sensitivity over a given range. Another object of my invention is to provide an arrangement for constricting one portion of the scale and expanding another portion of the scale which leaves the parts of the instrument free from mechanical strains. Other and further objects will become apparent as the description proceeds.

In accordance with my invention I supplement the customary torque producing elements of an electrical instrument or current responsive device with one or more supplementary torque producing elements or pairs of elements producing supplementary torques. The supplementary torque producing elements are so arranged that the supplementary torque varies at a different rate with the deflection of the instrument than the main torque, being completely reversed, if desired, from one portion of the scale to another in order to change the scale distribution which would be obtained from the main torque producing elements.

The features of my invention which I believe to be novel and patentable will be pointed out in the claims appended hereto. My invention itself, however, will be best understood by referring to the following description taken in connection with the accompanying drawing in which Fig. 1 represents the application of my invention to an instrument of the electrodynamometer type; Fig. 2 represents the same apparatus with the movable element in a different position with respect to the scale; Fig. 3 represents the scale of an instrument showing a typical scale distribution obtained from a simple electrodynamic instrument; Fig. 4 represents the modification in scale distribution obtained by retardation of the movable coil with respect to the pointer; Fig. 5 represents the increased expansion of the given portion of the scale obtained by retarding the movable coil and adding a supplementary torque producing element to the moving member; and Fig. 6 represents the modified arrangement in which the supplementary torque producing element is provided with a field independent from that of the main torque producing element.

Referring now more in detail to the drawing in which like reference characters refer to like parts throughout, I have shown for the sake of illustration an electrodynamometer having a pair of stationary field coils 11 and a movable current conducting coil 12 reacting therewith. But it will be understood that my invention is not limited to any particular type of current responsive device. Current conducting coil 12 is mechanically connected to the pointer 14 which cooperates with the scale 15. A spring 16 is provided to bias the moving element to the zero position.

The direction of the magnetic field produced by the stationary coils 11 is indicated by the dotted arrow F. As will be well understood by those skilled in the art, when the plane of the movable coil 12 is parallel to the axis F the torque with which the stationary and movable coils react will be a maximum. The restoring torque of the spring 16, however, increases with the deflection. Accordingly, the most open part of the scale will tend to lie in a region corresponding to positions of the moving coil 12 near parallelism to the axis F. As is well known, the variation in field strength with angular position is relatively small for a few degrees either side of this position and if uniformity is desired a sufficiently uniform field for practical purposes is obtained where the angular range of the pointer is approximately 90 degrees and the extreme positions lie approximately 45 degrees on either side of the position in which coil 12 is parallel to the axis F. Since in a dynamometer type instrument the torque in any position varies as the square of the current flowing in the coils, the pointer tends to deflect as the square of the measured quantity. A representative scale distribution for such an arrangement is shown in Fig. 3.

By retarding the coil 12 with respect to the pointer 14 so that the coil makes a greater angle with the field axis F for a zero deflection than for a maximum deflection, it will be seen, as shown in Fig. 1, that when the pointer 14 is in the left-hand portion of the scale 15 the coil 12 makes a relatively great angle with the axis F of the field coils 11 and consequently the torque produced is relatively small. On the other hand when, as shown in Fig. 2, the pointer 14 is in the right-hand portion of the scale 15, the coil 12 is close to parallelism with the axis F of the field coils 11, the torque of the instrument for a given current is at its maximum. Consequently the right-hand portion of the scale 15 is expanded as compared with the left-hand portion. This is illustrated by the scale distribution shown in Fig. 4.

In order to further expand the upper part of the scale and virtually suppress the lower portion of the scale as illustrated in Fig. 5, I add a supplementary torque producing element 13 to the moving member of the device. In the arrangement illustrated the supplementary element 13 may, if desired, take the form of a soft iron vane. If desired, the supplementary element 13 may be arranged to react with the same field 11 as the main torque producing element 12 of the moving member. However, it will be understood that I am not limited to this exact arrangement.

In the description it has been assumed that the connections of the coils 11 and 12 were such that the torque produced tended to move the pointer 14 in a clockwise direction. By referring to Fig. 1 it will be seen that the relative positions of coil 12 and supplementary torque producing element 13 are such that the supplementary torque resulting from the element 13 tends to move the pointer in a counter-clockwise direction thereby opposing the torque of the main element 12. However, when the moving element is in the position shown in Fig. 2 both the main element 12 and the supplementary element 13 tend to produce torque in a clockwise direction. Consequently, the supplementary element 13 tends to constrict the scale in the left-hand portion and to expand the scale in the right-hand portion.

The supplementary element 13, the axis of which is represented by heavy line 13, may take any desired form such as a supplementary coil or a vane of magnetic material. A vane of soft iron or similar material has the advantage that its magnetism is supplied externally and the supplementary torque reverses as soon as the vane moves from the position illustrated in Fig. 1 to that illustrated in Fig. 2. The degree to which the scale is expanded in the desired portion may be controlled by the angle between the vane 13 and the coil 12, it being understood that it is not necessary that the supplementary torque produced by vane 13 should reverse from one portion of the scale to another, but it is sufficient merely that the rate of change of torque with angular position should vary from that obtained by the main torque producing element 12.

Although I prefer, for the sake of compactness to place the main and the supplementary torque producing elements in the same portion of either the stationary or movable member, it will be understood that I am not limited to this arrangement. It will also be understood that I am not limited to the use of electrical windings to produce the field for either the main or the supplementary torque producing elements. For example, in the arrangement shown in Fig. 6 the main torque producing element is also of the dynamometer type having field coils 11 and a movable coil 12, but the supplementary torque producing element consists of a magnetic vane 13 acted upon by a magnetic field produced by a permanent magnet 16.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A current responsive device comprising in combination with a field producing member, a torque responsive member comprising a current conducting coil reacting with said field member to produce a torque in a given direction through a given range, and a magnetizable element at an angle to said current-conducting coil reacting with said field member to produce a torque in the same direction as said coil through a portion of said range and in the opposite direction through another portion of the range.

2. A suppressed zero measuring instrument comprising a field producing coil and movable element carrying a current conducting coil and a magnetic vane fixed at an angle to the plane of said current conducting coil.

3. A measuring instrument comprising field producing means and a member reacting therewith, said means and said member being relatively movable, said member comprising a current conducting coil and a magnetic vane arranged in different angular relationship to their associated field producing means so that the torques produced thereby vary at different rates.

STEPHEN C. HOARE.